US008229917B1

(12) United States Patent
Aneas et al.

(10) Patent No.: US 8,229,917 B1
(45) Date of Patent: Jul. 24, 2012

(54) DATABASE QUERY OPTIMIZATION USING CLUSTERING DATA MINING (75) Inventors: Fabio F. M. Aneas, Sao Paulo (BR);
Reinaldo T. Katahira, Anhagabau (BR);
Alessandro B. A. Mariano, Sao Paulo (BR); Pedro H. V. da Rocha, Indaiatuba (BR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/033,803

(22) Filed: Feb. 24, 2011

(51) Int. Cl.
*G06F 7/00* (2006.01)
(52) U.S. Cl. ...................................... 707/713
(58) Field of Classification Search .......... 707/713, 707/714, 718, 999.002
See application file for complete search history.

(56) References Cited

U.S. PATENT DOCUMENTS

| 6,278,989 B1 * | 8/2001 | Chaudhuri et al. ................. 1/1 |
| 6,865,567 B1 * | 3/2005 | Oommen et al. .................. 1/1 |
| 6,957,225 B1 | 10/2005 | Zait et al. |
| 7,249,120 B2 * | 7/2007 | Bruno et al. ...................... 1/1 |
| 7,647,293 B2 | 1/2010 | Brown et al. |
| 7,958,113 B2 * | 6/2011 | Fan et al. ..................... 707/718 |
| 2003/0158842 A1 * | 8/2003 | Levy et al. ..................... 707/3 |
| 2004/0128287 A1 | 7/2004 | Keller et al. |
| 2005/0278357 A1 * | 12/2005 | Brown et al. .................. 707/100 |
| 2008/0133454 A1 * | 6/2008 | Markl et al. .................... 707/2 |
| 2008/0306903 A1 * | 12/2008 | Larson et al. ................... 707/2 |
| 2009/0299989 A1 | 12/2009 | Zhang et al. |

OTHER PUBLICATIONS

SASH: A Self-Adaptive Histogram Set for Dynamically Changing Workloads, Lypeow Lim et al., Proceedings of the 29th VLDB conference, Berlin, Germany, 2003.*
Pavlov et al., Beyond Independence: Probabilistic Models for Query Approximation on Binary Transaction Data, 20 pages.
k-means clustering, From Wikipedia, http://en.wikipedia.org/wiki/K-means_clustering, Oct. 14, 2010 16:28, 8 pages.
J. MacQueen, Some Methods for Classification and Analysis of Multivariate Observations, pp. 281-297.
13 k-Means, http://download.oracle.com/docs/cd/B28359_01/datamine.111/b2812..., Oct. 14, 2010 16:31, 2 pages.
Terlecki et al., Microsoft SQL Server, Filtered Statistics, pp. 897-904, SIGMOD'09, Jun. 29-Jul. 2, 2009, Providence RI, USA., Copyright 2009 ACM 978-1-60558-551—Feb. 9, 2006.
Getoor et al., Selectivity Estimation using Probabilistic Models, 12 pages, ACM SIGMOD May 21-24, 2001, Santa Barbara, CA, USA, Copyright 2001 ACM 1-58113-332—Apr. 1, 2005.

* cited by examiner

*Primary Examiner* — Hung T Vy
(74) *Attorney, Agent, or Firm* — Schmeiser, Olsen & Watts; John Pivnichny (57) ABSTRACT

A method and system for optimizing a database query. A database table populated with data is received and scanned. Statistics and single column histograms associated with single columns of the table are determined. Cardinality based on the statistics and histograms is estimated. All possible correlations among multiple columns are determined by performing clustering data mining that partitions data in the table into clusters. Top ranked columns based on the correlations are determined. The difference between the estimated cardinality and a support count of a cluster is determined to exceed a threshold, and in response, multiple column histograms based on the top ranked columns are determined. An optimal query plan based on the multiple column histograms is generated.

20 Claims, 7 Drawing Sheets

DATABASE QUERY OPTIMIZATION USING CLUSTERING DATA MINING

TECHNICAL FIELD

The present invention relates to a data processing method and system for database management, and more particularly to performing database query optimization.

BACKGROUND

In known relational database management systems (RDBMS), table column level statistical histograms provide vital information to a state-of-the-art SQL optimizer that generates a query plan. With the table column level statistical histograms, the SQL optimizer accurately estimates the cardinality of a single column predicate. Whenever columns are added to the predicate, however, the accuracy of the cardinality estimate is deficient because the table column level statistical histograms fail to consider correlation and affinity between different columns. For instance, in a specific group of 1,000,000 people, the estimated number under the age of 10 is 20% of the total number of people and the estimated number taller than 5 feet 11 inches is 20% of the total number of people. According to these two isolated statistics, there would be an estimated 40,000 (i.e., 20%×20%×1,000,000) people in the specific group who are both under the age of 10 and taller than 5 feet 11 inches. According to common sense, however, this estimate of 40,000 is not reasonable, because people under the age of 10 are very unlikely to be taller than 5 feet 11 inches. An erroneous estimate of the number of rows in earlier stages of the evaluation of a query plan may jeopardize the efficiency of the plan due to the fact that the cost is directly affected by the estimate. Furthermore, known multiple column histogram techniques require a human administrator to take a significant amount of time to manually digest data for detecting multiple column affinity. Still further, many correlations between columns are not easily identifiable or identifiable by a human. Thus, there exists a need to overcome at least one of the preceding deficiencies and limitations of the related art.

BRIEF SUMMARY

Embodiments of the present invention provide a method of optimizing a database query. The method comprises:

a computer system receiving a database table populated with data;

the computer system scanning the database table;

the computer system determining statistics and single column histograms that describe data included in single columns of the database table;

the computer system estimating cardinality based on the statistics and the single column histograms;

the computer system determining all possible correlations among multiple columns by performing clustering data mining, wherein one or more columns of the multiple columns are included in the database table, and wherein the performing clustering data mining includes segregating the data that populates the database table into a plurality of clusters, each cluster having a corresponding rule whose conditions are matched by one or more rows of the database table, and further having a corresponding support count that indicates a number of rows of the database table that satisfy the rule;

the computer system ranking the multiple columns based on the determined correlations;

the computer system determining top ranked columns of the multiple columns based on the ranking;

the computer system determining the estimated cardinality differs from the corresponding support count by more than a threshold amount;

in response to determining the estimated cardinality differs from the corresponding support count by more than the threshold amount, the computer system determining multiple column histograms based on the top ranked columns; and the computer system generating an optimal query plan based on the multiple column histograms.

A system, program product and a process for supporting computing infrastructure where the process provides at least one support service are also described and claimed herein, where the system, program product and process for supporting computing infrastructure correspond to the aforementioned method.

Embodiments of the present invention provide a data query optimization technique using stable clustering data mining techniques that automatically and quickly detect multiple column correlations.

DETAILED DESCRIPTION OVERVIEW

Embodiments of the present invention may provide a method and system for adjusting the estimated selectivity of multiple column predicate to obtain a more accurate query plan or access plan cost. The technique disclosed herein includes an innovative method to automatically identify correlation and affinity between columns of a database using clustering data mining techniques, such as the k-means algorithm. The automatic detection of data column level correlation and affinity using clustering data mining provides a more accurate predicate selectivity to a database query optimizer and supports a decision tree for generating a more suitable query plan. The automatic detection of data column correlation and affinity disclosed herein provides an advantageous characteristic to a self-tuning database. As used herein, query plan is defined as an ordered set of steps used to access or modify information in a SQL relational database management system. As used herein, a database query optimizer is defined as a component of a relational database management system that examines multiple query plans that can satisfy a query and identifies an optimal query plan of the multiple query plans based on predetermined criteria.

In addition to the innovative aspect of automatically detecting multiple table column level correlation and affinity by using a clustering data mining technique, the technique disclosed herein may also include generating multiple column set histograms from different tables.

Table scan is an intensive disk input/output (I/O) consuming task which may take a significant amount of time to complete. In current database query optimization, table scan is almost unavoidably necessary to gather table statistics and single column histograms. In one embodiment, the data query optimization technique disclosed herein includes an additional data mining step that takes advantage of the blocks already in the buffer cache from the table scan to fetch the data column level correlation and affinity. In addition, embodiments of the present invention include an on demand approach in which the filter and access predicates generated by the query plan on the fly feed the data mining step. For multiple tables, embodiments of the present invention include a more complex and innovative approach that includes a new concept of gathering statistics and an explain plan based on gathering statistics from the actual result set of two joined tables. For columns within the same table, determining a multiple column correlation and affinity summary may be performed during a regularly scheduled gathering of statistics considering index key definitions and on demand according to access and filter predicates. For columns from different tables, determining a multiple column correlation and affinity summary may be performed during a regularly scheduled gathering of statistics considering foreign key definitions and on demand according to two tables joining access and filter predicates.

Figure 2:
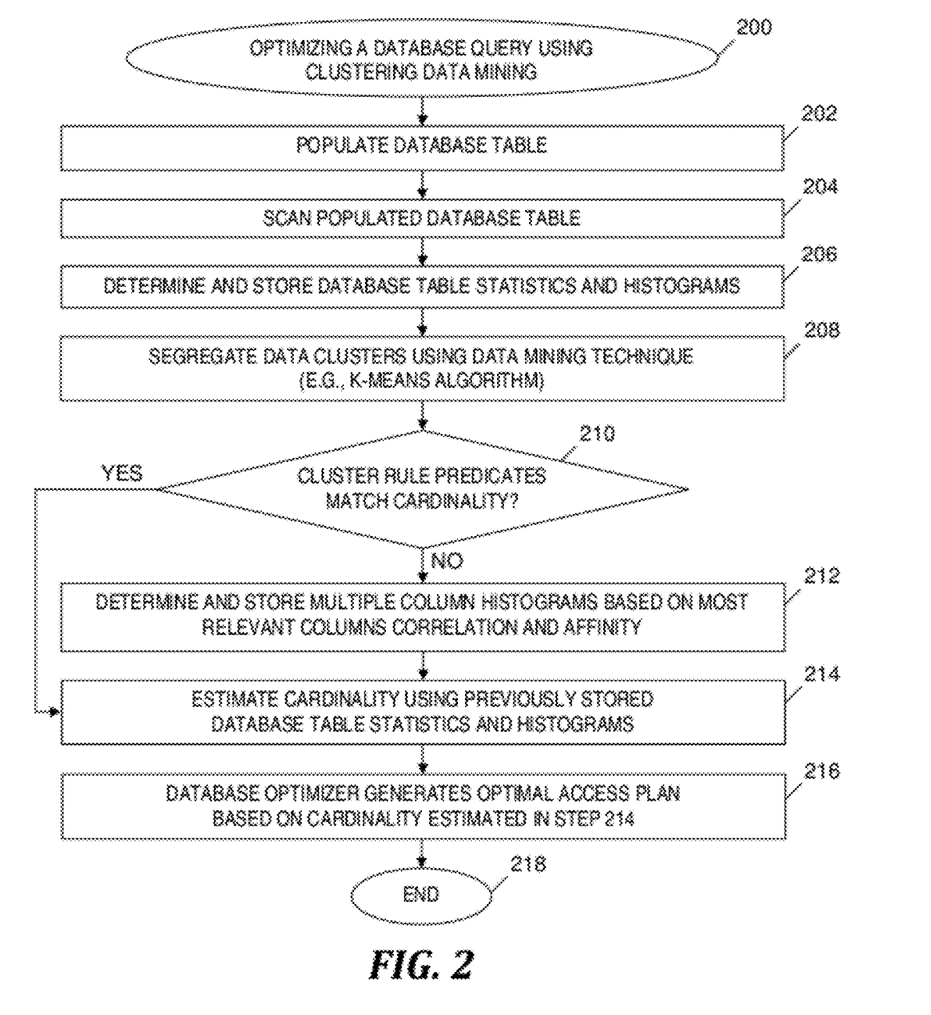
FIG. 2 is a flowchart of a process for database query optimization using clustering data mining, where the process is implemented in the system of FIG. 1, in accordance with embodiments of the present invention.

The clustering data mining algorithm (see step 208 in FIG. 2) carried out by embodiments of the present invention results in a set of clusters. Each row of a database table is referred to as a case that pertains to exactly one cluster in the set of clusters. A cluster includes:

Rule(s): Each rule includes a set of conditions that a case is most likely to match in order to pertain to the cluster.

Support count: The number of cases from the input dataset that satisfy a rule included in the cluster.

Confidence percentage: The percentage of cases from the input dataset that satisfy a rule included in the cluster.

Many cases may not fit in any cluster's rule; therefore, such cases are determined to pertain to the most likely cluster. For example, in a specific group of 1,000,000 people, one cluster may include:

Rule: IF AGE <=10 and HEIGHT <=5'0" THEN Cluster=21

Support count: 200,000

Confidence percentage: 90%

In the example above, all the cases specifying a person younger than 10 years old and smaller than 5'0" (i.e., five feet) are determined to pertain to a group of people with similar characteristics labeled "Cluster 21." The Confidence percentage of 90% represents 200,000 cases (i.e., 100% of the cases in the input dataset equals 222,222 cases); hence, 22,222 cases do not match all of the conditions in the rule, but most likely to pertain to the aforementioned group. For instance, a person is 9 years old, but is 5'1" tall.

A cluster with a high ratio of support count to the full amount (i.e., the total number of cases in the input dataset) is not efficiently accessed by an index in the database context, and for the database query optimizer to take notice of this finding, the multiple column set histogram is essential. Therefore, multiple column histograms may be created considering a ratio of support count to the full amount. Columns with some sort of affinity may be also found in different tables, and in order to generate multiple column set histograms from the different tables, the clustering data mining algorithm may be fed by a pre-prepared view of two tables joined instead of the actual single table, which is a common strategy in the clustering data mining technique.

Problem Description

In order to provide a set of relevant multiple column histograms, clustering data mining is used to identify correlation and affinity between the data columns (see step 208 in FIG. 2).

In a database index context, a predicate that filters up to 2% may be considered efficient and 50 clusters provides a split data into 2% each in a homogeneous distribution. However, in a non-homogeneous distribution, one cluster may stand out with a larger support count, which means that a query using the same cluster's rule predicate may not benefit from an index access.

For example, Oracle® Data Miner Tool applied the k-means Clustering Data Mining algorithm over a fictitious population's characteristics table with 1,000,000 rows with the following settings:

Number of Clusters: 50

Distance Function: Euclidean

Split Criterion: Variance

Minimum Error Tolerance 0.01

Maximum Iterations: 3

Minimum Support: 0.1

Number of Bins: 10

Block Growth: 2

In the example in this section, a leaf cluster resulted having an ID of 94, a confidence percentage of 94.84 and a support count of 145,094. The rule included in Cluster 94 is IF AGE >=5.0 and AGE <=11.657 and HEIGHT >=110.8 and HEIGHT <=133.6 and SALARY >=0.0 and SALARY <=785.6 and WEIGHT >=12.0 and WEIGHT <=30.0 THEN Cluster equals 94. The aforementioned rule included in Cluster 94 retrieves approximately 145,094 out of 1,000,000 sample rows, which is not appropriate for an index scan approach.

To address a model having too many predicates, the clustering data mining algorithm is able to provide a rank of the most relevant predicates. For instance, in order to restrict to the top 2 most relevant predicates, the Oracle® Data Miner Tool includes a check option "Show attributes with minimum relevance rank" associated with the value 2. Thus, for future implementations the multiple column histograms can be optimized to the most relevant columns only. For the aforementioned cluster in the example in this section, the clustering data mining algorithm identifies the top 2 most relevant attributes as AGE and SALARY.

For example, consider an actual query plan for a SQL Query in an Oracle® database 11g using histograms and extended stats (AGE, HEIGHT, WEIGHT, SALARY):

SELECT /*+ gather plan statistics */ *
FROM RTKATAHI.PERSON
WHERE AGE >=5.0 and AGE <=11.657 and
HEIGHT >=110.8 and HEIGHT <=133.6 and
SALARY >=0.0 and SALARY <=785.6 and
WEIGHT >=12.0 and WEIGHT <=30.0

In Oracle® database 11g, the SQL Query presented above retrieved 351,787 rows instead of 36,507 expected by the query plan, which means an 1100% divergence.

Consider an actual query plan for the same SQL Query in a DB2® v9 database using histograms and column groups (AGE, HEIGHT, WEIGHT, SALARY):

SELECT *
FROM RTKATAHI.PERSON
WHERE AGE >=5.0 and AGE <=11.657 and HEIGHT >=110.8 and HEIGHT <=133.6 and SALARY >=0.0 and SALARY <=785.6 and WEIGHT >=12.0 and WEIGHT <=30.0

In the DB2® v9 database, the SQL Query presented in the previous paragraph retrieved 351,787 rows instead of 46,821.757813 expected by the query plan, which means a 900% divergence.

In the last example, the predicates were used in favor of the most rows retrieval. A non-homogeneous distribution, however, may induce predicate combination with fewer rows retrieval. As one example, consider AGE <=10 and HEIGHT >=5'11" (i.e., 180 cm):

SELECT /*+gather plan statistics */ *
FROM RTKATAHI.PERSON
WHERE AGE <=10 and HEIGHT >=180

The SQL Query presented above retrieved 2,093 rows instead of 106,000 rows expected by the query plan, which means a 5,000% divergence.

Comparing histograms for AGE and HEIGHT between two of the clusters indicates that AGE and HEIGHT are closely related to each other.

Database Query Optimization System Using Data Mining

Figure 1:
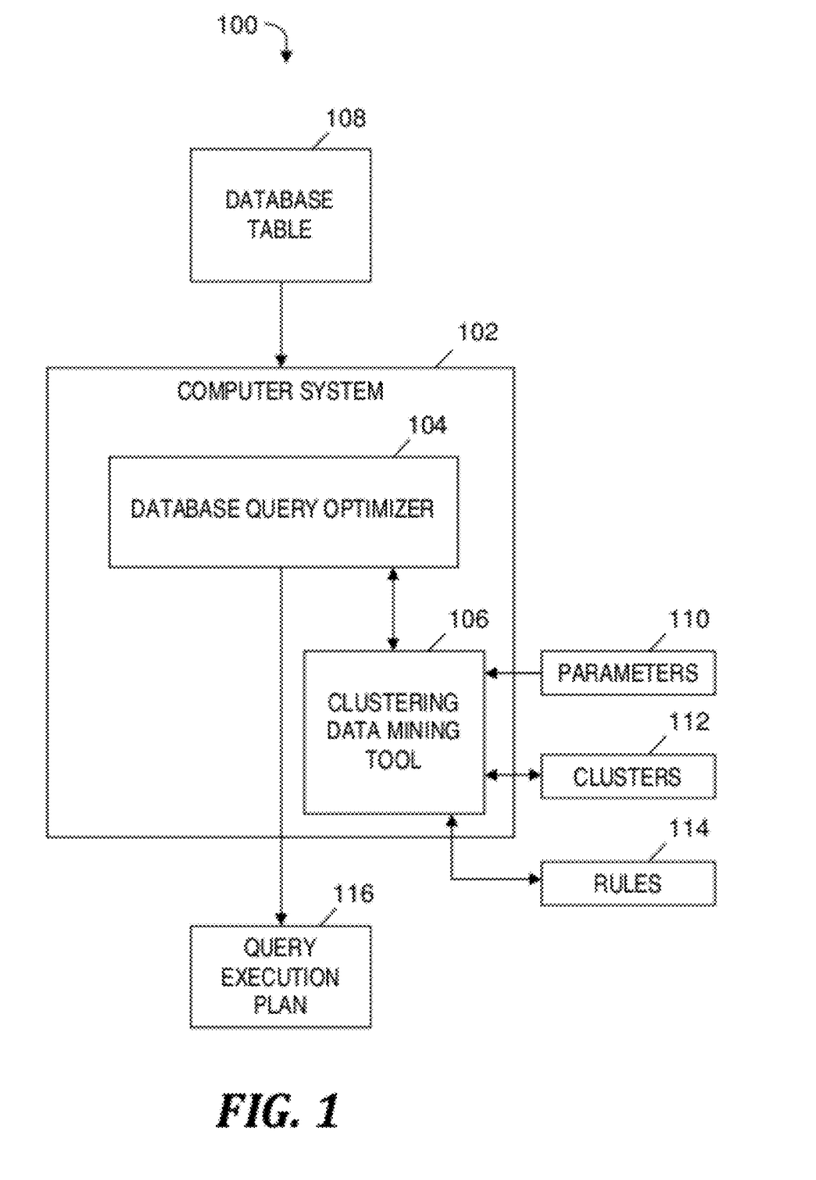
FIG. 1 is a block diagram of a system for database query optimization using clustering data mining, in accordance with embodiments of the present invention.

FIG. 1 is a block diagram of a system for database query optimization using clustering data mining, in accordance with embodiments of the present invention. A system 100 includes a computer system 102 that runs a software-based database query optimizer 104 (e.g., SQL optimizer) and a software-based clustering data mining tool. Computer system 102 receives scanned data from a database table 108. Clustering data mining tool receives parameters 110 to specify a clustering data mining technique (e.g., k-means algorithm). The clustering data mining tool 106 uses the specified clustering data mining technique to output clusters 112 of the received data and rules 114. Using the clusters 112 and rules 114, clustering data mining tool 106 automatically determines all possible correlations and affinity between multiple columns and ranks the correlations. Database query optimizer 104 determines multiple column histograms based on the top ranked correlations. Based on the multiple column histograms, database query optimizer 104 generates an optimal query plan 116. Additional functionality of the components of system 100 is discussed below with respect to FIG. 2.

Database Query Optimization Process Using Data Mining

FIG. 2 is a flowchart of a process for database query optimization using clustering data mining, where the process is implemented in the system of FIG. 1, in accordance with embodiments of the present invention. The process for optimizing a database query using clustering data mining starts at step 200. In step 202, computer system 102 (see FIG. 1) or another computer system populates database table 108 (see FIG. 1). For example, a massive data manipulation on database table 108 (see FIG. 1) requires a statistics and histogram update.

In step 204, database query optimizer 104 (see FIG. 1) scans the database table 108 (see FIG. 1), which was populated in step 202. The scan in step 204 may be a complete scan or a partial scan.

In step 206, database query optimizer 104 (see FIG. 1) determines and stores statistics and histograms that describe data in single, isolated columns of database table 108 (see FIG. 1). The statistics determined in step 206 include the number of rows, the density of the columns, the number of buckets for each histogram, and other relevant statistics.

Database query optimizer 104 (see FIG. 1) estimates cardinality using the statistics and histograms associated with the isolated columns (i.e., the statistics and histograms determined and stored in step 206).

In step 208, clustering data mining tool 106 (see FIG. 1) segregates data from data table 108 (see FIG. 1) into data clusters that share similar characteristics, where characteristics of the data are determined to be similar based on the rules 114 (see FIG. 1). The clustering data mining tool 106 (see FIG. 1) uses a clustering data mining technique, such as the k-means algorithm, to cluster the data from data table 108 (see FIG. 1). The k-means algorithm is described, for example, in J. B. MacQueen, "Some Methods for classification and Analysis of Multivariate Observations, Proceedings of 5th Berkeley Symposium on Mathematical Statistics and Probability," Berkeley, University of California Press (1967), pages 281-297.

The clustering data mining technique used in step 208 automatically determines all possible correlations among the multiple columns of data table 108 (see FIG. 1), and determines the top ranked columns based on the determined correlations. The number of top ranked columns is based on a predetermined number of top ranks to be determined. For example, if the predetermined number of top ranks is 2, then the clustering data mining technique determines the top 2 ranked columns based on the determined correlations among the multiple columns. The multiple column correlations and rankings of the columns are determined automatically in step 208 without requiring a human to manually digest, analyze and study the data and test findings that result from the human's analysis and study.

In step 210, database query optimizer 104 (see FIG. 1) determines whether or not the cluster rule predicates match the cardinality that was estimated based on the statistics and histograms determined in step 206. If step 210 determines that the cluster rule predicates do not match the estimated cardinality, then the No branch of step 210 is taken and step 212 is performed; otherwise the Yes branch of step 210 is taken and step 214 is performed.

That is, in step 210, database query optimizer 104 (see FIG. 1) determines whether the aforementioned cardinality estimated by the statistics and histograms determined in step 206 differs relevantly from a support count associated with a cluster generated in step 208. If step 210 determines that the estimated cardinality differs relevantly from the support count, then the No branch of step 210 is taken and step 212 is performed; otherwise, the estimated cardinality does not differ relevantly from the support count, the Yes branch of step 210 is taken, and step 214 is performed.

As used herein, "differs relevantly" is defined as differing by more than a predetermined level of acceptance (i.e., a threshold amount or percentage received by computer system 102 in FIG. 1 prior to step 210). For example, given a level of acceptance of 20%, if the estimated cardinality is more than 20% more than the support count of the cluster, then the No branch of step 210 is taken and step 212 is performed.

In step 212, database query optimizer 104 (see FIG. 1) determines and stores multiple column histograms based on the correlation and affinity of the most relevant columns of database table 108 (see FIG. 1). The database query optimizer 104 (see FIG. 1) determines the most relevant columns based on the top ranked columns determined in step 208 by the clustering data mining technique.

In step 214, which follows step 212 and also follows the Yes branch of step 210, database query optimizer 104 (see FIG. 1) estimates the cardinality based on the previously stored statistics and histograms (i.e., the statistics and histograms determined and stored in steps 206 and 212). Step 214 is triggered by the database query optimizer in response to a query (e.g., SQL query) being performed that involves tables associated with the previously determined statistics and histograms.

In step 216, database query optimizer 104 (see FIG. 1) generates the best (i.e., optimal) access plan (e.g., SQL access plan) or best query plan 116 (see FIG. 1), based on the statistics and histograms determined and stored in steps 206 and 212. The process of FIG. 2 ends at step 218.

Gathering Multiple Column Histograms

Frequency histogram: The example presented above in the Problem Description section in which the data table has 1,000,000 rows is continued in this section. In a classical approach, the number of distinct combinations of age and height may lead to the Cartesian product between the number of distinct values of age and the number of distinct values of height. Therefore, a recursive mode where the next column bin must fall within only one previous column bin histogram may be more reasonable for such cases.

Figure 3:
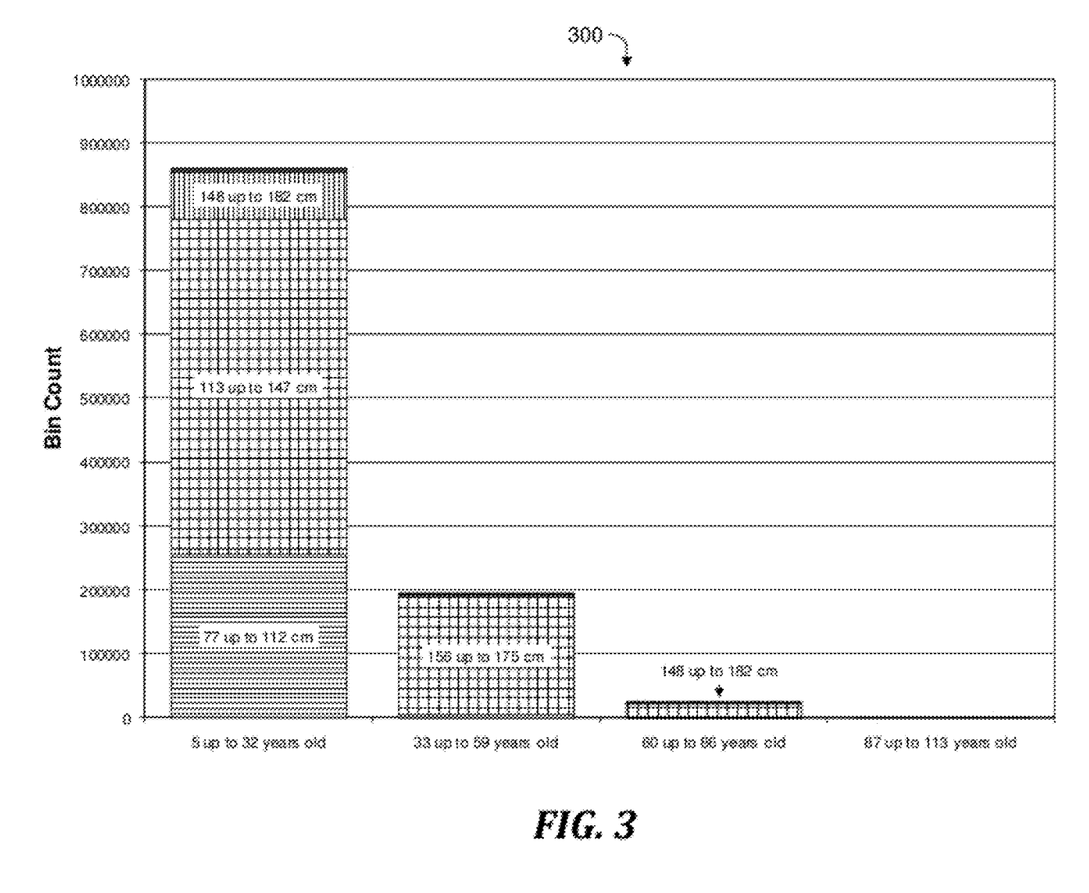
FIG. 3 is an example of a multiple column frequency histogram, in accordance with embodiments of the present invention.

FIG. 3 is an example of a multiple column frequency histogram 300. The query presented below provides an example of how to gather an age and height columns histogram with 4×4 frequency tiles, as shown in histogram 300 in FIG. 3.

```
SELECT /*+ Aggregating age and height frequency tiles */
    MIN(min_age) min_age,
    MAX(max_age) max_age,
    MIN(height) min_height,
    MAX(height) max_height,
    bin_age,
    bin_height,
    SUM(bin_count) bin_count
FROM
(
    SELECT /*+ Assigning to a specific age and height frequency tile */
        min_age,
        max_age,
        height,
        bin_age,
        FLOOR(((height-min_height)/(max_height-min_height+1))*4)
        bin_height,
        bin_count
    FROM
    (
        SELECT /*+ Retrieving MAX and MIN values of height within the age tiles */
            MIN(age) OVER (PARTITION BY bin_age) min_age,
            MAX(age) OVER (PARTITION BY bin_age) max_age,
            height,
            bin_age,
            MIN(height) OVER (PARTITION BY bin_age) min_height,
            MAX(height) OVER (PARTITION BY bin_age) max_height,
            bin_count
        FROM
        (
            SELECT /*+ Assigning to a specific age frequency tile */
                age,
                height,
                FLOOR(((age-min_age)/(max_age-min_age+1))*4) bin_age,
                bin_count
            FROM
            (
                SELECT /*+ Classical frequency histogram */
                    age,
                    MIN(age) OVER( ) min_age,
                    MAX(age) OVER( ) max_age,
                    height,
                    COUNT(*) bin_count
                FROM rtkatahi.person
                GROUP BY age, height
            )
        )
    )
)
GROUP BY bin_age, bin_height
ORDER BY bin_age, bin_height
```

Disregarding the column density, which is a vital statistic for a precise estimative, consider an exemplary predicate: AGE >=5 and AGE <=32 and HEIGHT <=112. According to histogram 300, approximately 250,000 rows satisfy the aforementioned predicate.

Height-balanced histogram: In the classical approach, each bin has the same number of rows to maintain the height balancing. The multiple column height-balanced histogram is an extension of the concept of the classical approach, where every previous bin inside another bin also has the same number of rows.

Figure 4:
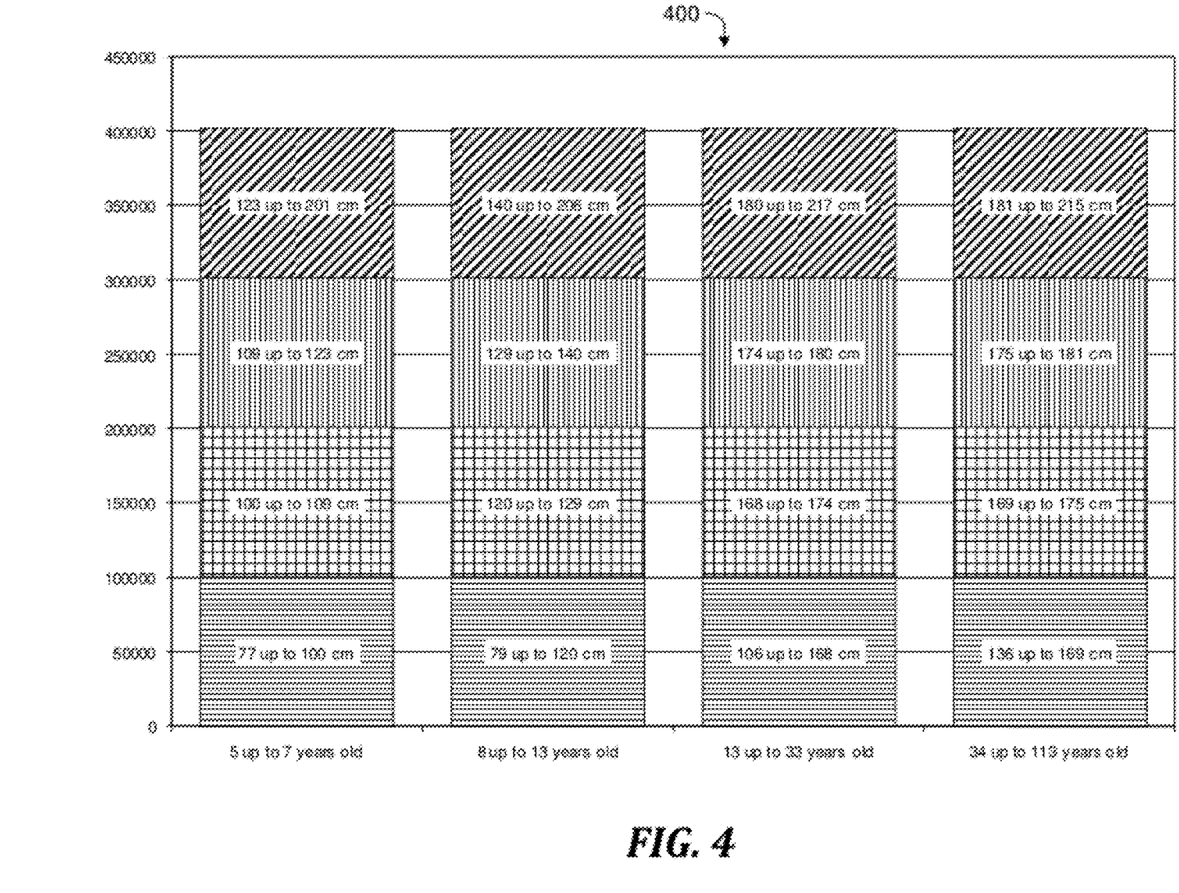
FIG. 4 is an example of a height-balanced, multiple column frequency histogram, in accordance with embodiments of the present invention.

FIG. 4 is an example of a height-balanced, multiple column frequency histogram 400. The query presented below provides an example of how to gather the age and height columns histogram with 4×4 frequency tiles, as shown in histogram 400 in FIG. 4.

```
SELECT /*+ Aggregating age and height frequency tiles */
    MIN(age) min_age,
    MAX(age) max_age,
    MIN(height) min_height,
    MAX(height) max_height,
    bin_age,
    bin_height,
    COUNT(*) bin_count
FROM
(
    SELECT /*+ Assigning to a specific height tile */
        age,
        height,
        bin_age,
        NTILE(4) OVER (PARTITION BY bin_age ORDER BY height) bin_height
    FROM
    (
        SELECT /*+ Classical height balanced histogram and assigning to a specific age tile */
            age,
            height,
            NTILE(4) OVER (ORDER BY age, height) AS bin_age
        FROM rtkatahi.person
    )
)
GROUP BY bin_age, bin_height
ORDER BY bin_age, bin_height
```

NTILE in the query presented above is an Oracle® database analytical function that provides the homogeneous distribution of rows within a specific partition split by the number provided as an argument.

Disregarding the column density, which is a vital statistic for a precise estimative, consider an exemplary predicate: AGE >8 and AGE <13 and HEIGHT <120. According to histogram 400, approximately 100,000 rows satisfy the aforementioned exemplary predicate.

Advanced height-balanced histogram: Frequency histograms may generate empty tiles. Furthermore, in a height balanced histogram, the same value may coexist in two different tiles due to the fact that the boundaries are split by quantity. For example, one tile is 106 up to 168 cm and the next tile is 168 up to 174 cm, thereby making 168 cm belong to both tiles. Therefore, embodiments of the present invention include an intermediate technique between frequency and height-balanced histograms using analytic cumulative functions, which may be employed to determine multiple column histograms in step 212 (see FIG. 2).

Figure 5:
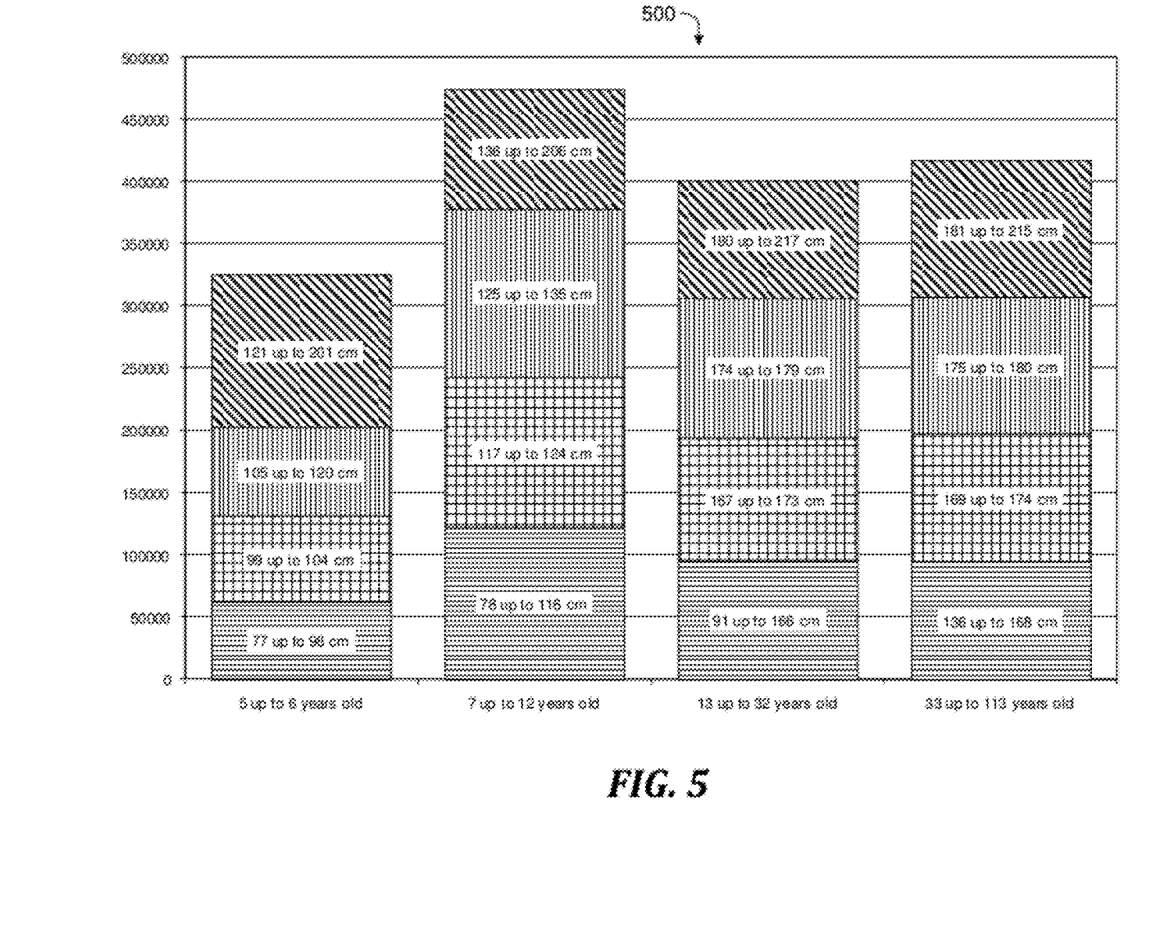
FIG. 5 is an example of an advanced height-balanced, multiple column frequency histogram that is determined in the process of FIG. 2 and that is compared to the histograms in FIG. 3 and FIG. 4, in accordance with embodiments of the present invention.

FIG. 5 is an example of an advanced height-balanced, multiple column frequency histogram 500. The query presented below shows how to gather an advanced height-balanced age and height columns histogram with 4×4 frequency tiles, as shown in histogram 500 in FIG. 5.

```
SELECT /*+ Aggregating age and height tiles */
    MIN(min_age) min_age,
    MAX(max_age) max_age,
    MIN(height) min_height,
    MAX(height) max_height,
    bin_age,
    bin_height,
    count(*) bin_count
FROM
(
    SELECT /*+ Assigning to a specific height tile */
        MIN(age) OVER (PARTITION BY bin_age) min_age,
        MAX(age) OVER (PARTITION BY bin_age) max_age,
        height,
        bin_age,
        CEIL((CUME_DIST( ) OVER (PARTITION BY
            bin_age ORDER BY height))*4)
            bin_height
    FROM
    (
        SELECT /*+ Assigning to a specific age tile */
            age,
            height,
            CEIL((CUME_DIST( ) OVER (ORDER BY
                age))*4) bin_age
        FROM rtkatahi.person
    )
)
GROUP BY bin_age, bin_height
ORDER BY bin_age, bin_height
```

CUME_DIST in the query presented above is an Oracle® database analytical function that provides the cumulative distribution within a specific partition in a percentage.

Disregarding the column density, which is vital statistic for a precise estimative, consider an exemplary predicate: AGE >=7 and AGE <=12 and HEIGHT <=116. According to histogram 500, approximately 125,000 rows satisfy the aforementioned exemplary predicate.

Storing Multiple Column Histograms

Figure 6:
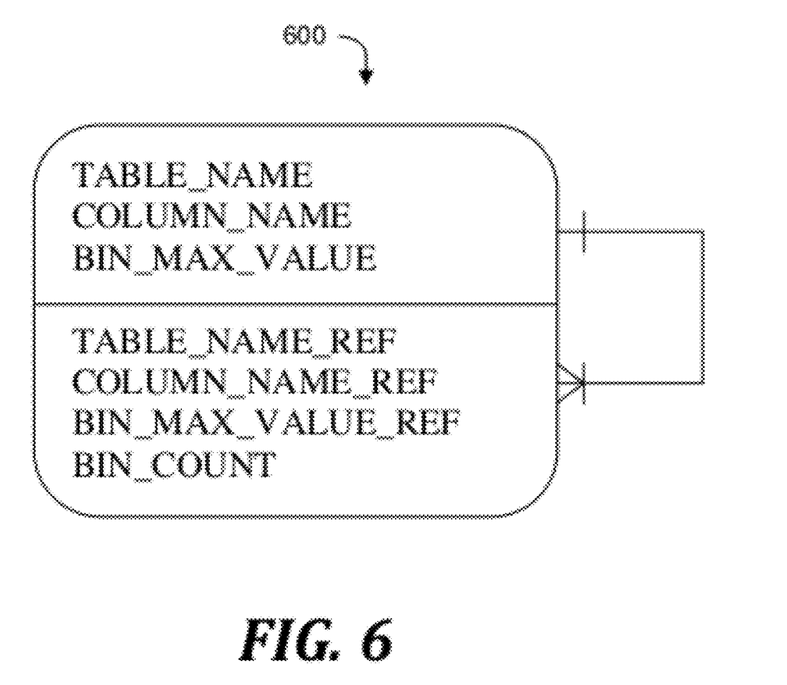
FIG. 6 depicts a data model of a table that stores multiple column histograms in the process of FIG. 2, in accordance with embodiments of the present invention.

FIG. 6 depicts a data model 600 of a self-related table that stores multiple column histograms in the process of FIG. 2, in accordance with embodiments of the present invention. For example, the table presented in data model 600 may store histogram 500 in FIG. 5.

The recursive approach is able to store as many columns as necessary. The leaf row would provide the BIN_COUNT shown in Table 1.

TABLE 1

| TABLE_NAME | COLUMN_NAME | BIN_MAX_VALUE | TABLE_NAME_REF | COLUMN_NAME_REF | BIN_MAX_VALUE_REF | BIN_COUNT |
|---|---|---|---|---|---|---|
| PERSON | AGE | 7 | <NULL> | <NULL> | <NULL> | <NULL> |
| PERSON | HEIGHT | 100 | PERSON | AGE | 7 | 100510 |
| PERSON | HEIGHT | 109 | PERSON | AGE | 7 | 100510 |
| PERSON | HEIGHT | 123 | PERSON | AGE | 7 | 100510 |
| PERSON | HEIGHT | 201 | PERSON | AGE | 7 | 100510 |
| PERSON | AGE | 13 | <NULL> | <NULL> | <NULL> | <NULL> |
| PERSON | HEIGHT | 120 | PERSON | AGE | 13 | 100510 |
| PERSON | HEIGHT | 129 | PERSON | AGE | 13 | 100510 |
| PERSON | HEIGHT | 140 | PERSON | AGE | 13 | 100510 |
| PERSON | HEIGHT | 206 | PERSON | AGE | 13 | 100510 |
| PERSON | AGE | 33 | <NULL> | <NULL> | <NULL> | <NULL> |
| PERSON | HEIGHT | 168 | PERSON | AGE | 33 | 100510 |
| PERSON | HEIGHT | 174 | PERSON | AGE | 33 | 100510 |
| PERSON | HEIGHT | 180 | PERSON | AGE | 33 | 100510 |
| PERSON | HEIGHT | 217 | PERSON | AGE | 33 | 100510 |
| PERSON | AGE | 113 | <NULL> | <NULL> | <NULL> | <NULL> |
| PERSON | HEIGHT | 169 | PERSON | AGE | 113 | 100510 |
| PERSON | HEIGHT | 175 | PERSON | AGE | 113 | 100510 |
| PERSON | HEIGHT | 181 | PERSON | AGE | 113 | 100510 |
| PERSON | HEIGHT | 215 | PERSON | AGE | 113 | 100510 |

Considering the same predicate considered previously: AGE >=8 and AGE <=13 and HEIGHT <=120. According to histogram 400 (see FIG. 4), approximately 100,000 rows satisfy this predicate and the query presented below retrieves this estimative from the stored table presented in data model 600 (see FIG. 6).

```
SELECT
    SUM(BIN_COUNT)
FROM
(
    SELECT
        LEVEL,
        H.*
    FROM
        HISTOGRAMS H
    CONNECT BY
        TABLE_NAME_REF=PRIOR TABLE_NAME
        AND COLUMN_NAME_REF=PRIOR COLUMN_NAME
        AND BIN_MAX_VALUE_REF=PRIOR BIN_MAX_VALUE
```

```
START WITH
    BIN_MAX_VALUE >=8
    AND BIN_MAX_VALUE <=13
)
WHERE
    BIN_MAX_VALUE <=120
```

In the query presented above, CONNECT BY is an Oracle® database condition intended to provide a recursive query. The START WITH clause is related to AGE >=8 AND BIN_MAX_VALUE <=13 and the outer WHERE is related to the HEIGHT <=120 cm.

In the aforementioned fictitious population characteristics table, there are 99 distinct age values and distinct height values. Therefore, a 99×144 tiles frequency histogram is built and runs the following query:

```
SELECT
    SUM(BIN_COUNT)
FROM
(
    SELECT
    LEVEL,
    H.*
    FROM
    HISTOGRAMS H
    CONNECT BY
    TABLE_NAME_REF=PRIOR TABLE_NAME
    AND    COLUMN_NAME_REF=PRIOR    COLUMN_
        NAME
    AND  BIN_MAX_VALUE_REF=PRIOR  BIN_MAX_
        VALUE
    START WITH
    BIN_MAX_VALUE <=10
)
WHERE
    BIN_MAX_VALUE >=180
```

The query presented above estimates exactly 2,093 rows as shown above in the Problem Description section, in the example where AGE <=10 and HEIGHT >=180 cm (i.e., 5'11").

The query presented below estimates 366,232 rows matching exactly the actual query results considering AGE >=5 and AGE <=11.657 and HEIGHT >=110.8 cm and HEIGHT <=133.6 cm where the Oracle® 11g optimizer estimates a cardinality of 180,000 rows and DB2® v9 estimates 20,671.32 rows.

```
SELECT
    SUM(BIN_COUNT)
FROM
(
    SELECT
    LEVEL,
    H.*
    FROM
    HISTOGRAMS H
    CONNECT BY
    TABLE_NAME_REF=PRIOR TABLE_NAME
    AND    COLUMN_NAME_REF=PRIOR    COLUMN_
        NAME
    AND  BIN_MAX_VALUE_REF=PRIOR  BIN_MAX_
        VALUE
    START WITH
    BIN_MAX_VALUE >=5
    AND BIN_MAX_VALUE <=11.657
)
WHERE
    BIN_MAX_VALUE   >=110.8   AND   BIN_MAX_
VALUE <=133.6
```

Clustering K-Means Algorithm

There are many available implementations of the k-means algorithm as a method included in clustering data mining. The k-means algorithm groups n cases into k clusters, in which each case pertains to the cluster of the nearest centroid. In one embodiment, a centroid is the mean point of all the cases in the cluster based on the Euclidean space. A result of employing the k-means algorithm is minimizing the objective function presented below:

$$\operatorname{argmin} \sum_{j=1}^{k} \sum_{i=1}^{n} \|x_i^j - c_j\|^2,$$

where k is the number of defined clusters, n is the number of cases in the specific cluster, $x_i^j$ is a case within the specific cluster, $c_j$ is the cluster's centroid, and $\|x_i^j - c_j\|^2$ is the distance measure between case and centroid.

The k-means algorithm is composed of the following steps:
1. Arbitrarily place k points into the space representing an initial group of centroids (i.e., "means").
2. Assign each case in the dataset to the cluster that has the nearest centroid, based on a distance function (e.g., Euclidean distance function) determining distances between each case and each centroid.
3. Recalculate the positions of each centroid by assigning each centroid to the mean point of all the cases in the corresponding cluster.
4. Repeat Steps 2 and 3 until the centroids stabilize (i.e., until the clusters converge), so that the algorithm is deemed to have converged when the assignments no longer change.

Computer System

Figure 7:
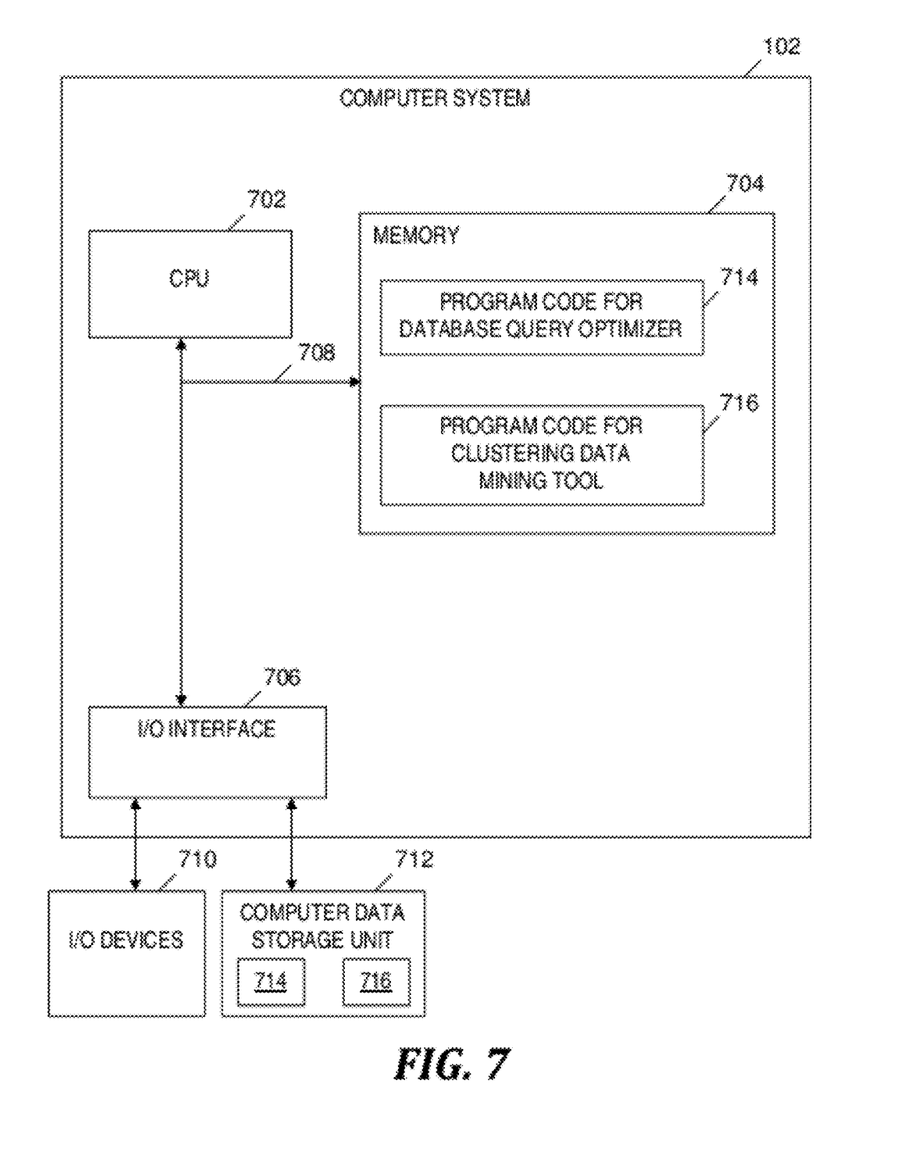
FIG. 7 is a block diagram of a computer system that is included in the system of FIG. 1 and that implements the process of FIG. 2, in accordance with embodiments of the present invention.

FIG. 7 is a block diagram of a computer system that is included in the system of FIG. 1 and that implements the process of FIG. 2, in accordance with embodiments of the present invention. Computer system 102 generally comprises a central processing unit (CPU) 702, a memory 704, an input/output (I/O) interface 706, and a bus 708. Further, computer system 102 is coupled to I/O devices 710 and a computer data storage unit 712. CPU 702 performs computation and control functions of computer system 102, including carrying out instructions included in program code 714 and 716 to perform database query optimization using a clustering data mining technique, where the instructions are carried out by CPU 702 via memory 704. CPU 702 may comprise a single processing unit, or be distributed across one or more processing units in one or more locations (e.g., on a client and server).

Memory 704 may comprise any known computer-readable storage medium, which is described below. In one embodiment, cache memory elements of memory 704 provide temporary storage of at least some program code (e.g., program code 714 and 716) in order to reduce the number of times code must be retrieved from bulk storage while instructions of the program code are carried out. Moreover, similar to CPU 702, memory 704 may reside at a single physical location, comprising one or more types of data storage, or be distributed across a plurality of physical systems in various forms. Further, memory 704 can include data distributed across, for example, a local area network (LAN) or a wide area network (WAN).

I/O interface 706 comprises any system for exchanging information to or from an external source. I/O devices 710 comprise any known type of external device, including a display device (e.g., monitor), keyboard, mouse, printer, speakers, handheld device, facsimile, etc. Bus 708 provides a communication link between each of the components in computer system 102, and may comprise any type of transmission link, including electrical, optical, wireless, etc.

I/O interface 706 also allows computer system 102 to store information (e.g., data or program instructions such as program code 714 and 716) on and retrieve the information from computer data storage unit 712 or another computer data storage unit (not shown). Computer data storage unit 712 may comprise any known computer-readable storage medium, which is described below. For example, computer data storage unit 712 may be a non-volatile data storage device, such as a magnetic disk drive (i.e., hard disk drive) or an optical disc drive (e.g., a CD-ROM drive which receives a CD-ROM disk).

Memory 704 and/or storage unit 712 may store computer program code 714 and 716 that includes instructions that are carried out by CPU 702 via memory 704 to perform database query optimization using a clustering data mining technique. Although FIG. 7 depicts memory 704 as including program code 714 and 716, the present invention contemplates embodiments in which memory 704 does not include all of code 714 and 716 simultaneously, but instead at one time includes only code 714, only code 716, only a portion of code 714 and/or 716, or a combination of code 714 and 716.

Further, memory 704 may include other systems not shown in FIG. 7, such as an operating system (e.g., Linux) that runs on CPU 702 and provides control of various components within and/or connected to computer system 102.

Storage unit 712 and/or one or more other computer data storage units (not shown) that are coupled to computer system 102 may store parameters 110 (see FIG. 1), clusters 112 (see FIG. 1), and rules 114 (see FIG. 1).

As will be appreciated by one skilled in the art, the present invention may be embodied as a system, method or computer program product. Accordingly, an aspect of an embodiment of the present invention may take the form of an entirely hardware aspect, an entirely software aspect (including firmware, resident software, micro-code, etc.) or an aspect combining software and hardware aspects that may all generally be referred to herein as a "module". Furthermore, an embodiment of the present invention may take the form of a computer program product embodied in one or more computer-readable medium(s) (e.g., memory 704 and/or computer data storage unit 712) having computer-readable program code (e.g., program code 714 and 716) embodied or stored thereon.

Any combination of one or more computer-readable mediums (e.g., memory 704 and computer data storage unit 712) may be utilized. The computer readable medium may be a computer-readable signal medium or a computer-readable storage medium. In one embodiment the computer-readable storage medium is a computer-readable storage device or computer-readable storage apparatus. A computer-readable storage medium may be, for example, but not limited to, an electronic, magnetic, optical, electromagnetic, infrared or semiconductor system, apparatus, device or any suitable combination of the foregoing. A non-exhaustive list of more specific examples of the computer-readable storage medium includes: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be a tangible medium that can contain or store a program (e.g., program 714 and program 716) for use by or in connection with a system, apparatus, or device for carrying out instructions.

A computer readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with a system, apparatus, or device for carrying out instructions.

Program code (e.g., program code 714 and 716) embodied on a computer-readable medium may be transmitted using any appropriate medium, including but not limited to wireless, wireline, optical fiber cable, RF, etc., or any suitable combination of the foregoing.

Computer program code (e.g., program code 714 and 716) for carrying out operations for aspects of the present invention may be written in any combination of one or more programming languages, including an object oriented programming language such as Java®, Smalltalk, C++ or the like and conventional procedural programming languages, such as the "C" programming language or similar programming languages. Instructions of the program code may be carried out entirely on a user's computer, partly on the user's computer, as a stand-alone software package, partly on the user's computer and partly on a remote computer or entirely on the remote computer or server, where the aforementioned user's computer, remote computer and server may be, for example, computer system 102 or another computer system (not shown) having components analogous to the components of computer system 102 included in FIG. 7. In the latter scenario, the remote computer may be connected to the user's computer through any type of network (not shown), including a LAN or a WAN, or the connection may be made to an external computer (e.g., through the Internet using an Internet Service Provider).

Aspects of the present invention are described herein with reference to flowchart illustrations (e.g., FIG. 2) and/or block diagrams of methods, apparatus (systems) (e.g., FIG. 1 and FIG. 7), and computer program products according to embodiments of the invention. It will be understood that each block of the flowchart illustrations and/or block diagrams, and combinations of blocks in the flowchart illustrations and/or block diagrams, can be implemented by computer program instructions (e.g., program code 714 or 716). These computer program instructions may be provided to one or more hardware processors (e.g., CPU 702) of a general purpose computer, special purpose computer, or other programmable data processing apparatus to produce a machine, such that the instructions, which are carried out via the processor(s) of the computer or other programmable data processing apparatus, create means for implementing the functions/acts specified in the flowchart and/or block diagram block or blocks.

These computer program instructions may also be stored in a computer-readable medium (e.g., memory 704 or computer data storage unit 712) that can direct a computer (e.g., computer system 102), other programmable data processing apparatus, or other devices to function in a particular manner, such that the instructions (e.g., program 714 and 716) stored in the computer-readable medium produce an article of manufacture including instructions which implement the function/act specified in the flowchart and/or block diagram block or blocks.

The computer program instructions may also be loaded onto a computer (e.g., computer system 102), other programmable data processing apparatus, or other devices to cause a series of operational steps to be performed on the computer, other programmable apparatus, or other devices to produce a computer implemented process such that the instructions (e.g., program 714 and 716) which are carried out on the computer, other programmable apparatus, or other devices provide processes for implementing the functions/acts specified in the flowchart and/or block diagram block or blocks.

Any of the components of an embodiment of the present invention can be deployed, managed, serviced, etc. by a service provider that offers to deploy or integrate computing infrastructure with respect to performing database query optimization using a clustering data mining technique. Thus, an embodiment of the present invention discloses a process for supporting computer infrastructure, wherein the process comprises providing at least one support service for at least one of integrating, hosting, maintaining and deploying computer-readable code (e.g., program code 714 and 716) in a computer system (e.g., computer system 102) comprising one or more processors (e.g., CPU 702), wherein the processor(s) carry out instructions contained in the code causing the computer system to perform database query optimization using a clustering data mining technique.

In another embodiment, the invention provides a method that performs the process steps of the invention on a subscription, advertising and/or fee basis. That is, a service provider, such as a Solution Integrator, can offer to create, maintain, support, etc. a process of performing data query optimization using a clustering data mining technique. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flowcharts in FIG. 2 and the block diagrams in FIG. 1 and FIG. 7 illustrate the architecture, functionality, and operation of possible implementations of systems, methods, and computer program products according to various embodiments of the present invention. In this regard, each block in the flowchart or block diagrams may represent a module, segment, or portion of code (e.g., program code 714 and 716), which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of optimizing a database query, said method comprising:

a computer system receiving a database table populated with data;

said computer system scanning said database table;

said computer system determining statistics and single column histograms that describe data included in single columns of said database table;

said computer system estimating cardinality based on said statistics and said single column histograms;

said computer system determining all possible correlations among multiple columns by performing clustering data mining, wherein one or more columns of said multiple columns are included in said database table, and wherein said performing clustering data mining includes segregating said data that populates said database table into a plurality of clusters, each cluster having a corresponding rule whose conditions are matched by one or more rows of said database table, and further having a corresponding support count that indicates a number of rows of said database table that satisfy said rule;

said computer system ranking said multiple columns based on said determined correlations;

said computer system determining top ranked columns of said multiple columns based on said ranking;

said computer system determining said estimated cardinality differs from said corresponding support count by more than a threshold amount;

in response to said determining said estimated cardinality differs from said corresponding support count by more than said threshold amount, said computer system determining multiple column histograms based on said top ranked columns; and said computer system generating an optimal query plan based on said multiple column histograms.

2. The method of claim 1, further comprising said computer system receiving a parameter k, wherein said segregating said data into said plurality of clusters includes carrying out a k-means algorithm that partitions n cases indicated by rows of said database table into k clusters.

3. The method of claim 1, wherein said determining all possible correlations among multiple columns includes:

determining said multiple columns are within said database table; and determining said possible correlations during a regularly scheduled occurrence of said determining said statistics based on index key definitions or determining said possible correlations on demand based on access and filter predicates.

4. The method of claim 1, wherein said determining all possible correlations among multiple columns includes:

determining said multiple columns are in different database tables; and determining said possible correlations during a regularly scheduled occurrence of said determining said statistics based on foreign key definitions or determining said possible correlations on demand based on a join of access and filter predicates of said different database tables.

5. The method of claim 1, wherein said determining all possible correlations among multiple columns by said performing clustering data mining includes automatically determining said possible correlations without a human manually analyzing data included in said multiple columns.

6. A computer system comprising:
a central processing unit (CPU);
a computer-readable memory coupled to said CPU; and
a computer-readable tangible storage device coupled to said CPU, said storage device including program code configured to be carried out by said CPU via said memory to implement a method of optimizing a database query, said method comprising:
receiving a database table populated with data;
scanning said database table;
determining statistics and single column histograms that describe data included in single columns of said database table;
estimating cardinality based on said statistics and said single column histograms;
determining all possible correlations among multiple columns by performing clustering data mining, wherein one or more columns of said multiple columns are included in said database table, and wherein said performing clustering data mining includes segregating said data that populates said database table into a plurality of clusters, each cluster having a corresponding rule whose conditions are matched by one or more rows of said database table, and further having a corresponding support count that indicates a number of rows of said database table that satisfy said rule;
ranking said multiple columns based on said determined correlations;
determining top ranked columns of said multiple columns based on said ranking;
determining said estimated cardinality differs from said corresponding support count by more than a threshold amount;
in response to said determining said estimated cardinality differs from said corresponding support count by more than said threshold amount, determining multiple column histograms based on said top ranked columns; and
generating an optimal query plan based on said multiple column histograms.

7. The computer system of claim 6, wherein said method further comprises receiving a parameter k, wherein said segregating said data into said plurality of clusters includes carrying out a k-means algorithm that partitions n cases indicated by rows of said database table into k clusters.

8. The computer system of claim 6, wherein said determining all possible correlations among multiple columns includes:
determining said multiple columns are within said database table; and
determining said possible correlations during a regularly scheduled occurrence of said determining said statistics based on index key definitions or determining said possible correlations on demand based on access and filter predicates.

9. The computer system of claim 6, wherein said determining all possible correlations among multiple columns includes:
determining said multiple columns are in different database tables; and
determining said possible correlations during a regularly scheduled occurrence of said determining said statistics based on foreign key definitions or determining said possible correlations on demand based on a join of access and filter predicates of said different database tables.

10. The computer system of claim 6, wherein said determining all possible correlations among multiple columns by said performing clustering data mining includes automatically determining said possible correlations without a human manually analyzing data included in said multiple columns.

11. A computer program product comprising a computer-readable, tangible storage device coupled to a processor of a computer system, said storage device having computer-readable program code stored therein, said computer-readable program code containing instructions that are carried out by said processor to implement a method of optimizing a database query, said method comprising:
receiving a database table populated with data;
scanning said database table;
determining statistics and single column histograms that describe data included in single columns of said database table;
estimating cardinality based on said statistics and said single column histograms;
determining all possible correlations among multiple columns by performing clustering data mining, wherein one or more columns of said multiple columns are included in said database table, and wherein said performing clustering data mining includes segregating said data that populates said database table into a plurality of clusters, each cluster having a corresponding rule whose conditions are matched by one or more rows of said database table, and further having a corresponding support count that indicates a number of rows of said database table that satisfy said rule;
ranking said multiple columns based on said determined correlations;
determining top ranked columns of said multiple columns based on said ranking;
determining said estimated cardinality differs from said corresponding support count by more than a threshold amount;
in response to said determining said estimated cardinality differs from said corresponding support count by more than said threshold amount, determining multiple column histograms based on said top ranked columns; and
generating an optimal query plan based on said multiple column histograms.

12. The program product of claim 11, wherein said method further comprises receiving a parameter k, wherein said segregating said data into said plurality of clusters includes carrying out a k-means algorithm that partitions n cases indicated by rows of said database table into k clusters.

13. The program product of claim 11, wherein said determining all possible correlations among multiple columns includes:
determining said multiple columns are within said database table; and
determining said possible correlations during a regularly scheduled occurrence of said determining said statistics based on index key definitions or determining said possible correlations on demand based on access and filter predicates.

14. The program product of claim 11, wherein said determining all possible correlations among multiple columns includes:
determining said multiple columns are in different database tables; and
determining said possible correlations during a regularly scheduled occurrence of said determining said statistics based on foreign key definitions or determining said possible correlations on demand based on a join of access and filter predicates of said different database tables.

15. The program product of claim 11, wherein said determining all possible correlations among multiple columns by said performing clustering data mining includes automatically determining said possible correlations without a human manually analyzing data included in said multiple columns.

16. A process for supporting computing infrastructure, said process comprising providing at least one support service for at least one of creating, integrating, hosting, maintaining, and deploying computer-readable code in a computer system comprising a processor, wherein said processor carries out instructions contained in said code causing said computer system to perform a method of optimizing a database query, said method comprising:
- said computer system receiving a database table populated with data;
- said computer system scanning said database table;
- said computer system determining statistics and single column histograms that describe data included in single columns of said database table;
- said computer system estimating cardinality based on said statistics and said single column histograms;
- said computer system determining all possible correlations among multiple columns by performing clustering data mining, wherein one or more columns of said multiple columns are included in said database table, and wherein said performing clustering data mining includes segregating said data that populates said database table into a plurality of clusters, each cluster having a corresponding rule whose conditions are matched by one or more rows of said database table, and further having a corresponding support count that indicates a number of rows of said database table that satisfy said rule;
- said computer system ranking said multiple columns based on said determined correlations;
- said computer system determining top ranked columns of said multiple columns based on said ranking;
- said computer system determining said estimated cardinality differs from said corresponding support count by more than a threshold amount;
- in response to said determining said estimated cardinality differs from said corresponding support count by more than said threshold amount, said computer system determining multiple column histograms based on said top ranked columns; and
- said computer system generating an optimal query plan based on said multiple column histograms.

17. The process of claim 16, wherein said method further comprises said computer system receiving a parameter k, wherein said segregating said data into said plurality of clusters includes carrying out a k-means algorithm that partitions n cases indicated by rows of said database table into k clusters.

18. The process of claim 16, wherein said determining all possible correlations among multiple columns includes:
- determining said multiple columns are within said database table; and
- determining said possible correlations during a regularly scheduled occurrence of said determining said statistics based on index key definitions or determining said possible correlations on demand based on access and filter predicates.

19. The process of claim 16, wherein said determining all possible correlations among multiple columns includes:
- determining said multiple columns are in different database tables; and
- determining said possible correlations during a regularly scheduled occurrence of said determining said statistics based on foreign key definitions or determining said possible correlations on demand based on a join of access and filter predicates of said different database tables.

20. The process of claim 16, wherein said determining all possible correlations among multiple columns by said performing clustering data mining includes automatically determining said possible correlations without a human manually analyzing data included in said multiple columns.

* * * * *